United States Patent [19]

Oswald et al.

[11] 4,365,030
[45] Dec. 21, 1982

[54] OVERTREATED HIGHER DIALKYL DIMETHYL AMMONIUM CLAY GELLANTS

[75] Inventors: Alexis A. Oswald, Mountainside; Harry W. Barnum, Edison, both of N.J.

[73] Assignee: Exxon Research and Engineering Co., Florham Park, N.J.

[21] Appl. No.: 780,450

[22] Filed: Mar. 23, 1977

Related U.S. Application Data

[60] Continuation-in-part of Ser. No. 712,667, Aug. 9, 1976, abandoned, which is a division of Ser. No. 509,809, Sep. 27, 1974, Pat. No. 3,974,125.

[30] Foreign Application Priority Data

Aug. 20, 1975 [CA] Canada .................................. 233773
Aug. 22, 1975 [GB] United Kingdom ............... 34951/75
Sep. 5, 1975 [IT] Italy .............................. 26976 A/75
Sep. 18, 1975 [DE] Fed. Rep. of Germany ....... 2541557
Sep. 20, 1975 [FR] France ............................. 75 29615

[51] Int. Cl.$^3$ ...................... C08L 67/08; C08L 67/06
[52] U.S. Cl. .................................... 523/508; 523/521; 524/236; 524/445; 524/601; 524/604; 260/448 C
[58] Field of Search ................. 252/21, 28; 260/22 M, 260/22 A, 448 C, 40 R; 525/4; 523/508, 521; 524/445, 236, 601, 604

[56] References Cited

U.S. PATENT DOCUMENTS

| | | | |
|---|---|---|---|
| 2,531,440 | 11/1950 | Jordan | 252/28 |
| 2,966,506 | 12/1960 | Jordan | 260/448 |
| 3,514,401 | 5/1970 | Armstrong et al. | 252/28 |
| 3,929,849 | 12/1975 | Oswald | 260/448 C |
| 3,974,125 | 8/1976 | Oswald et al. | 260/40 R |

FOREIGN PATENT DOCUMENTS 904880 9/1962 United Kingdom .
1190383 5/1970 United Kingdom .
1439828 6/1976 United Kingdom .

OTHER PUBLICATIONS

Jordan et al., "Organophylic Bentonites III, Inherent Properties", *Journal Kolloid-Zeitschrift*, 137, 40–49, (1954).
Grahom et al., *J. Am. Ceram. Soc.*, 21, 176–183, (1938).
McActee, *American Mineralogist*, 4, 1230–1236, (1955).
Jordan, *J. Phys. Colloid Chem.*, 53, 294–305, (1950).
Jordan et al., *J. Phys. Coll. Chem.*, 54, 1196–1207, (1950).
Theng, "The Chemistry of Clay Reactions", pp. 224, 229–232, (1974).
Kennedy et al., *Nat. Lub. Grease Inst. Spokesman*, 29, (5), 138–145, (1965).
McAtee, *Nat. Lub. Grease Inst. Spokesman*, 33, (2), 51–60, (1969).
GK, Technical Data Bulletin, "Rapid Evaluation Procedures for Astra-Tone 40 in Coating Systems", Oct. 1972.
Crookshank et al., "The Evaluation of Components for Nonsoap Thickened Greases", *NLGI Spokesman*, 41, (3), pp. 81–86, (Jun., 1977).

*Primary Examiner*—L. T. Jacobs
*Attorney, Agent, or Firm*—Albert P. Halluin

[57] ABSTRACT

Novel higher dialkyl dimethyl ammonium clays, of superior gellant effectiveness in oxygenated organic liquids, can be produced by the overtreatment of layer and chain type mineral clays via ion exchange reactions. For example, a layered dioctadecyl dimethyl ammonium montmorillonite, a superior gellant for alkyd resin based coatings, is prepared by the reaction of sodium montmorillonite with a 12 to 25% excess of the corresponding quaternary chloride beyond the known ion exchange capacity of the clay. The overtreatment is preferably carried out in a mixture of water and organic solvent which disperses the clay and dissolves the quaternary ammonium salt.

19 Claims, No Drawings

OVERTREATED HIGHER DIALKYL DIMETHYL AMMONIUM CLAY GELLANTS

CROSS-REFERENCE TO RELATED PATENTS

This application is a continuation-in-part of U.S. Application Ser. No. 712,667, filed Aug. 9, 1976, now abandoned, which in turn is a division of U.S. Application Ser. No. 509,809, filed Sept. 27, 1974, now U.S. Pat. No. 3,974,125, granted Aug. 10, 1976, entitled "Higher Dialkyl Dimethyl Ammonium Gelling Agents For Unsaturated Polyester Compositions". This application is also generally related to U.S. Pat. No. 3,929,849, issued to Alexis A. Oswald, Dec. 30, 1975, entitled "Tetraalkyl Phosphonium Aluminosilicates".

FIELD OF THE INVENTION

This invention relates to novel organophilic quaternary ammonium clay compositions, namely higher dialkyl dimethyl ammonium clays, having layer and chain type structures. More particularly, this invention relates to overtreated gellant derivatives of layered clays having a high ion exchange capacity and their method of preparation. The present derivatives of such clays are produced by treating mineral clays with a 12 to 25% excess amount of the corresponding ammonium salt. Such overtreated ammonium clays, particularly montmorillonites are superior gellants, e.g., for alkyd resin based coatings.

DESCRIPTION OF THE PRIOR ART

Layered quaternary higher dialkyl dimethyl ammonium clays containing ammonium groups equivalent to the ion exchange capacity of the starting inorganic clay are known thixotropic gelling agents for toluene and other hydrocarbon solvents containing aromatic components. Their properties and applications were reviewed by J. W. Jordan and F. J. Williams in an article, entitled "Organophylic Bentonites III, Inherent Properties" [Journal Kolloid-Zeitschrift 137, 40-48 (1954)]. The compositions and their uses are largely covered by patents of J. W. Jordan which are assigned to the National Lead Company, i.e. NL Industries. One of the basic patents issued to Jordan, i.e. U.S. Pat. No. 2,531,440, provides a good summary of the state of the art as it relates to the present invention.

The above-referred Jordan patent states, from column 4, line 72 to column 5, line 26, that when preparing ammonium clay gellants, such as the higher dialkyl dimethyl ammonium montmorillonites, optimum gellant compositions are obtained by using equivalent reactants. The term "equivalent" means that the clay reactant is contacted with amounts of the ammonium salt reactant which correspond to the ion exchange capacity of the clay. The ion exchange capacity of the clay is obtained by determining the amount of ammonium acetate which reacts with the clay when an excess of ammonium acetate is used as a reactant. See R. P. Graham and J. D. Sullivan J. Am. Ceram. Soc., 21, 176-183 (1938). The value of the ion exchange capacity is expressed in miliequivalents per 100 g. dry clay (me).

Furthermore, Jordan in U.S. Pat. No. 2,531,440 describes from column 4, line 72 to column 5 line 10 and in Examples 1, 2, 4, particularly Example 4, that an advantageous method for the preparation of his compositions consists of reacting a dilute aqueous dispersion of sodium montmorillonite with the quaternary ammonium salt.

The exchange of the sodium and calcium cations of a Wyoming montmorillonite, i.e. bentonite, having an ion exchange capacity of 92 m.e. by various amounts of quaternary dimethyl dioctadecyl ammonium chloride was studied in aqueous media by J. L. McAtee of the National Lead Co. He reported in American Mineralogist, 4, 1230-1236, (1955) that only sodium ions were exchanged by the quaternary ions up to and at the 90 m.e. quaternary salt treatment level. At the next higher treatment levels, 118 and 140 m.e. about 10 me calcium ion and an additional 2 me sodium ion were exchanged.

McAtee did not disclose either the properties of the overtreated clays or their uses. However, J. W. Jordan reported previously [J. Phys. Colloid Chem. 53, 294-305, (1950) at page 304] that the swelling in nitrobenzene of a higher dialkyl dimethyl montmorillonite, i.e., dodecyl hexadecyl dimethyl ammonium bentonite, was adversely affected by overtreatment. Since the swelling of organo-clays usually parallels their gelling ability, this Jordan publication is an indication of the adverse effects of overtreatment on gelling efficacy. A similar adverse indication is provided in another paper by J. W. Jordan, B. J. Hook and C. M. Finlayson (J. Phys. Coll. Chem. 54, 1196-1207 (1950) at page 1203) on the gel strength of toluene thickened by primary octadecyl ammonium bentonites of varying treatment level.

The ion exchange reactions of clays having a layer or chain type structure by treatment with up to a 100% excess of ammonium salts in $C_1$ to $C_3$ alcohol media were broadly disclosed in British patent No. 1,190,383 in 1966 by B. J. Fowler. Although this disclosure was all inclusive, no specific quaternary ammonium salt reactant or product was named or described.

A recent monograph entitled "The Chemistry of Clay Organic Reactions" by B. K. G. Theng—a Holstead Press Book published by J. Wiley & Sons, New York (1974) particularly Chapter 5, pages 224, 229 to 232, makes it clear that the effect of clay overtreatment depends on the structure of the ammonium salt reactants. With regard to the properties of the organic ammonium clay products Theng stated that the hydrophilic character reaches a minimum, i.e. the lipophilic character a maximum at the ion exchange capacity. That means that on the basis of the prior art no improved organophilic gellants were expected from the overtreatment of clays.

THE DISCOVERIES OF THE INVENTION

In contrast to the prior art, it has now been discovered that novel higher dialkyl dimethyl ammonium clays, particularly montmorillonites of unexpectedly desirable gellant properties in oxygenated organic liquids are obtained if the level of clay overtreatment is kept within certain limits. In studying the interaction of such overtreated clays with organic liquids of varying polarity, it was discovered that they depend on clay overtreatment. As a result, the discoveries of the present invention have led to overtreated clay gellants for some organic liquids which could not be gelled by known clay gellants.

The novel compositions of the present invention have a surprisingly high ammonium cation and low anion content in relation to the inorganic clay part. The inherent gelling properties of the novel compositions are surprisingly different and superior to those of the related prior art compositions, e.g., the novel gellants are more effective in non-hydrocarbons especially high molecular weight liquids used for coating such as alkyd resins. This is a most important unexpected effect. The related prior art compositions are more effective in hydrocarbon solvents. In the prior art, only the hydrocarbon gelling effect of the prior art compositions was known.

The improvement of the gelling ability of the overtreated compositions of the present invention in oil based coatings free from aromatic hydrocarbon solvents is of particular importance due to current environmental considerations. Aromatic hydrocarbons such as toluene which were considered key coating components in known organo clay gellant interactions are to be essentially eliminated from environmentally acceptable coatings. The present overtreated clays provide new possibilities for the formulation of acceptable thixotropic coatings.

It was furthermore found in the present invention that the improved, overtreated higher dialkyl dimethyl ammonium clays can be advantageously prepared using a mixture of water and a polar organic liquid such as isopropanol as reaction media. Such media lead to an unexpectedly increased degree of ion exchange. This in turn results in having an increased amount of the quaternary ammonium salt component in the form of the aluminosilicate rather than the chloride derivative.

SUMMARY OF THE INVENTION

Quaternary higher dialkyl dimethyl ammonium montmorillonite clay products containing ammonium ions in a concentration equivalent to the ion exchange capacity of the starting clay are known gellants for aromatic hydrocarbons. The organophilic properties of such gellants depend on the polar character of the liquid to be gelled. This observation led to this work, extending the study of correlations between gellant effectiveness and solvent polarity to overtreated clays.

In one aspect of the present invention, there are disclosed quaternary higher dialkyl dimethyl ammonium montmorillonite clay compositions of layer and chain type structure which contain ammonium ions in a concentration ranging from about 12 to about 25% above the ion exchange capacity of the clay as expressed in milliequivalents per 100 g. dry clay and as determined by the amount of ammonium acetate which reacts with the clay when an excess of ammonium acetate is used as a reactant.

In another aspect of the present invention there is provided a process for preparing quaternary higher dialkyl dimethyl ammonium clay compositions comprising, reacting a quaternary ammonium dialkyl dimethyl ammonium compound and a clay in reaction media comprising a mixture of water and a polar organic liquid.

In the following, novel overtreated higher dialkyl dimethyl ammonium clays and their preparation are disclosed. It is shown that such overtreated clays, particularly montmorillonites, containing a 12 to 25% excess of the quaternary ion, have unexpectedly superior gellant properties in oxygenated organic compounds, such as alkyd type polyesters, although they are inferior in aromatic hydrocarbons such as toluene.

DESCRIPTION OF THE PREFERRED EMBODIMENTS

Product Compositions

The quaternary higher dialkyl dimethyl ammonium clays useful in the present invention can be represented by the general formula:

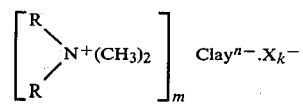

wherein R is an independently selected $C_8$ to $C_{35}$ saturated n-alkyl group. It is preferred that R ranges from $C_{14}$ to $C_{22}$. In the most preferred case R ranges from $C_{16}$ to $C_{18}$. It is specifically preferred that R be a hydrogenated tallow group. The term "Clay" designates a layered or fibrous crystalline aluminosilicate of high ion exchange capacity and mineral origin. Sodium and unsubstituted ammonium aluminosilicates having 25 to 200 milliequivalent (me) of exchangeable cations per 100 g. are preferred. Even more preferred are clays having ion exchange capacities ranging from 50 to 170 me per 100 g. The most preferred clays have 80 to 120 me ion exchange capacity per 100 g. Layered type clays are structurally preferred, particularly the three layer class. It is most preferred to use a montmorillonite type clay in the sodium salt form.

The symbol "X" represents an anion selected from the group consisting of chloride, $C_1$ to $C_{18}$ carboxylate, sulfate, $C_2$ to $C_8$ dialkyl phosphate or phosphite, $C_1$ to $C_{18}$ sulfonate such as formate, octanoate, dimethyl phosphate, dibutyl phosphite, methanesulfonate, dodecylbenzenesulfonate. X is preferably chloride or acetate and most preferably chloride.

The symbols m and n are positive integers, with the proviso that m is greater than n. The symbol "m" represents the number of quaternary ammonium cations in the composition and the symbol "n" represents the number of negative changes on an aluminosilicate moiety, i.e., particles which are balanced by exchangeable cations in the starting inorganic clay. The symbol "n" is related to ion exchange capacities of clays as discussed in the monograph entitled "Clay Mineralogy" by R. E. Grim, published by McGraw Hill, Inc. New York (1968). These ion exchange capacities are usually known on the basis of the extent of the sodium clay plus excess ammonium acetate reaction.

As a consequence, the compositions can contain some X anions, e.g., chloride anions, to help to preserve the principle of electroneutrality of salts. The symbol "k" in the formula represents the number of anions. As such, "k" can range from 0 to m-n. It is, however, preferred that k be 1 to 50. The difference between n and m is preferably 5 to 30. Most preferably, k ranges from 12 to 25.

In the case of a typical Wyoming sodium montmorillonite, the values of the above numbers may range as follows: n=80-100; m=102-116, preferably 105 to 111; k=0 to 20, preferably 1 to 10. Optimum products are derived in ion exchange reactions by maximizing the value of m and minimizing that of the k.

Exemplary clay compositions are dioctyl, ditertradecyl, dihexadecyl, dioctadecyl, diheptadecyl, dieicosyl, didocosyl, ditriacontyl and dipentatriacontyl, dimethyl ammonium derivatives of montmorillonite, hectorite, attapulgite, vermiculite, etc., containing, e.g. chloride anions.

In terms of overtreatment, the novel overtreated clays preferably contain 12 to 25 excess, more preferably a 15 to 20% excess of the quaternary ion moiety.

OVERTREATMENT PROCESS

The quaternary higher alkyl dialkyl dimethyl ammonium clay can be prepared by reacting a clay, preferably sodium clays with an excess of a higher dialkyl dimethyl ammonium salt, above the known ion exchange values as indicated by the following reaction scheme:

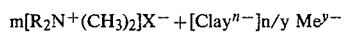

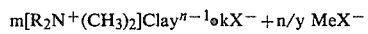

$$m[R_2N^+(CH_3)_2]X^- + [Clay^{n-}]n/y\ Me^{y-}$$

$$m[R_2N^+(CH_3)_2]Clay^{n-1} \bullet kX^- + n/y\ MeX^-$$

wherein Me is Na, K, NH$_4$, Ca, Mg preferably Na, NH$_4$, most preferably Na, y is 1 or 2, preferably 1 and the other symbols have meanings previously defined. When X is monovalent, m has the same value as k.

The type of clay mineral to be used may vary with the intended use. Among the preferred clays are those having crystalline, layer type structures. For optimum gelling properties, it is best to use a three layer type montmorillonite which exhibits good swelling properties in water and a high ion exchange capacity. However, some non-swelling clays, when converted to the ammonium salt form, will swell in organic liquids and give rise to thixotropic colloidal dispersions. The latter clays such as the two layer type kaolinites can be also used. Another useful clay is the chain structure type attapulgite. The clays particularly contemplated are the alkali metal and alkali earth metal montmorillonites, e.g. sodium and potassium, montmorillonites particularly of the Wyoming type, most specifically naturally occurring sodium montmorillonite.

These clays are particularly characterized by an unbalanced crystal lattice, are believed to have negative charges which are normally neutralized by inorganic cations. As found in nature, therefore, they exist as salts of the clay acid with bases such as the alkali or alkaline-earth metal hydroxides. The base-exchange capacities of the various clays enumerated generally range from about 25 to about 100, based upon milliequivalents of ammonium acetate exchangeable base per 100 grams of clay. The montmorillonites have comparatively high base-exchange capacities, viz., 60–100. Attapulgite has substantial base-exchange capacity, viz., 25–35. Generally, the clays of higher base-exchange capacities are particularly preferred.

Surprisingly, the preferred products of the present invention, having inherently better gelling properties, are prepared when the reaction is carried out in a mixture of a polar organic solvent and water rather than in water alone. The organic solvent is preferably miscible with the water and is preferably selected from the group of C$_1$ to C$_{12}$ alcohols, ketones, ethers, nitriles, sulfones, carboxylic acids, carboxylic esters and amides. Solvents in the C$_1$ to C$_4$ range are preferred, particularly, the alcohols. Exemplary solvents are methanol, dodecanediol, methyl ethyl ketone, dimethyl ether, dioxane, furane, acetonitrile, pyrrolidone, dimethyl sulfone, acetic acid, methyl acetate, dimethyl formamide. Isopropanol is most preferred.

The ratio of the solvent to water in the reaction media is not critical, provided that the quaternary salt reactant is dissolved and the starting clay is dispersed in the medium. The preferred solvent to water ratio ranges from about 1:20 to about 2:1, more preferably from about 1:10 to about 1:3.

The unexpected effect of the solvent chemically manifests itself in higher conversions, i.e., higher values of the m and lower values of the k in the product. This effect is particularly critical when making the novel compositions having an excess of the quaternary ammonium groups.

The reaction does not depend on the temperature. From the practical point of view it is carried out below the boiling point of the solvent mixture and above the freezing point of water. Preferred temperatures are between 10° and 90°. Slightly elevated temperatures between 40° and 80° are even more preferred since they result in an increased solubility of the quaternary salt reactants.

The ratio of the quaternary salt reactant to the clay corresponds to the ratio of m to n in the product. Surprisingly, the ammonium group is essentially quantitatively incorporated into the product. The ammonium salt is preferably used as a solution. This is added to the suspension of the clay at as fast a rate as practicable. A salt solution may be combined with a clay suspension in a flow system to produce the reaction mixture.

The reaction is very fast. The combination of the reactants results in an immediate sharp increase of the viscosity of the clay mixture. Within a few minutes this is followed by a reduction of the viscosity due to the separation of macroscopic product particles. The product is usually separated within a few hours by filtration and may be washed before drying. The particle size of the dry product is usually reduced below 200 mesh size by known means of pulverizing and milling before or during its use.

The reaction does not depend on the concentration of the reactants. However, to prepare the preferred compositions in a practical manner it is important to have the clay in the form of well stirrable colloidal suspension. The clay concentration is preferably 0.5 to 10%, more preferably 1 to 5%. The quaternary salt is preferably in solution of a concentration of preferably 3 to 80% more preferably 5 to 20%.

PRODUCT PROPERTIES

The properties of the products are largely dependent on their microstructure. For example, in the case of the layered montmorillonite derivatives, a characteristic of the microstructure is the interplanar spacing. This is the repeat distance between the aluminosilicate layers. It has been found that in the case of the overtreated clays, this distance is surprisingly dependent on the number of carbon atoms of the higher n-alkyl substituents of the quaternary ammonium moieties. Such a dependence in the C$_{14}$ to C$_{18}$ alkyl range is in contrast with the prior art observations by Jordan on monoalkyl ammonium clays of the same carbon range. This indicates an unexpected difference between the microstructure of overtreated ammonium clays and the stoichiometric compositions reported previously. The microstructure presently found is due to a certain orientation of the higher alkyl groups between the aluminosilicate layers in a manner described for quaternary phosphonium clays by A. A. Oswald in U.S. Pat. No. 3,929,849.

The novel compositions are unexpectedly useful as thixotropic components of polar organic liquids of preferably nonhydrocarbon character, more preferably oxygenated organic compounds, particularly polyesters wherein related prior art compositions are not effective. The present compositions are specifically useful in the so-called alkyd resins. The latter are polyesters derived from fatty acids such as stearic acid, polyols such as glycerol or glycol and dicarboxylic acids such as phthalic anhydride.

Certain types of alkyds, the so-called long oil alkyd resins are the most commonly used base for general purpose industrial coatings. Such base resins are usually diluted with minor amounts of a hydrocarbon solvent. For example, 30% of mineral spirits may be employed.

The present compositions in general will provide improved thixotropic compositions in polyesters including unsaturated polyesters such as those described in U.S. Pat. No. 3,974,125 by Oswald and Barnum. Among other oxygenated compounds are as examples polyalkylene terephthalates, nylon type polyamides, epoxide resins. An example of nonhydrocarbons containing no oxygen is polyvinylchloride.

Related prior art thixotropic gellants are known to interact with the hydrocarbon solvent. The present gellants surprisingly interact with nonhydrocarbons. The latter activity depends on the presence of excess quaternary ammonium groups in the present compositions. Dependent on the amount of this excess, the activity of the present compositions shows an unexpected optimum. The ammonium excess in the optimum composition is dependent on the structure of the quaternary ammonium moiety, the aluminosilicate and the anion present.

EXAMPLE 1

Preparation of Higher Dialkyl Dimethyl Ammonium Montmorillonite Compositions Having About 10% Excess of the Ammonium Moiety Quaternary $C_8$ to $C_{22}$ dialkyl dimethyl ammonium drivatives of a Wyoming montmorillonite were prepared via reactions of the corresponding ammonium chlorides with sodium montmorillonite in the manner disclosed in Example 1 of U.S. Pat. No. 3,974,125, the disclosure of which is incorporated herein by reference.

The sodium montmorillonite used was Georgia Kaolin Co.'s Mineral Colloid BP a refined clay of the composition corresponding to the summary formula:

$$(Si_{7.34}Al_{0.66}).Al_{3.18}Fe^{3+}{}_{0.37}Mg_{0.54}O_{20}(OH)_4Ca_{0.10}K_{0.04}Na_{0.68}$$

This clay (MCBP) was indicated to have an ion exchange capacity of 90 milliequivalents (me) per 100 g dry clay. In the present work, however, 99 me of the quaternary salts per 100 g clay was used.

The quaternary ammonium chloride reactants were laboratory chemicals purchased from Lachat Chemicals.

In general, water-isopropanol mixtures were used as reaction media. Mixtures of the same concentration were used to disperse the clay and to dissolve the quaternary salt. The concentration of the quaternary reactant solution was 10%. The concentration of the clay in the overall reaction mixture was 2%. With the increasing length of the higher alkyl substituents of the quaternary salts, their water solubility decreased and, consequently, the isopropanol concentrations employed increased from 0 to 50%.

Both the clay suspension and the quaternary solution were kept at 50° C. At that temperature the quaternary reactant was added all at once to the clay suspension which was being stirred at a high rate. This resulted in an immediate large increase of the viscosity followed in 2–3 minutes by a thinning of the solvent and the formation of the product precipitate. Stirring at 50° C. was continued for 30 minutes. The mixture was then filtered with suction at the same temperature. The products were washed for filtration three times on the Buchner-funnel by fresh aqueous isopropanol of the composition used in the reaction. The fifth wash employed water. At the 30 g. starting clay level the volume of liquid for one wash was 300 ml. Products having increasing alkyl substituents were increasingly hydrophobic and easy to filter. The washed, filtered products nevertheless still had a water content of about 90%. They were dried under 0.1 mm pressure either at ambient temperature or at 60° C. The dry products were ball milled overnight and then passed through a 200 mesh screen. Thereafter, they were analyzed and evaluated. Their interplanar spacings of the 001 reflection by X-ray and elemental compositions are shown in Table I.

The interplanar spacing of the products as determined by X-ray diffraction analysis, i.e., the repeat distance between the layers, was much larger than that of the starting clay, 12° A vs. 18° A or greater. The interplanar distance of the products was increasing with the length of the higher alkyl substituents of the quaternary nitrogen. In the case of the $C_8$ to $C_{16}$ derivatives the change of this distance per two carbon increase of the alkyl substituents was decreasing. Overal the definite changes in the $C_{14}$ to $C_{18}$ alkyl range were in contrast with the observations of Jordan on monoalkylammonium montmorillonites of the same range. Jordan reported no change whatsoever in this region [*Journal of Physical and Colloid Chemistry* 53, 297 (1950)]. This indicates an unexpected difference between the microstructure of the present ammonium clays and of those reported previously. This microstructure is apparently differentiated by the various orientations of the higher alkyl groups between the aluminosilicate layers.

As it is also shown by Table I, the found elemental composition of the clays was in fair agreement with the calculated compositions assuming the attachment of all the ammonium groups to the clay. The chlorine content of the products is low indicating that the clay undergoes the reaction with the large higher dialkyl dimethyl ammonium ion beyond its prior art ion exchange capacity.

TABLE I

Interplanar Spacing and Composition of Quaternary Higher Dialkyl Dimethyl Ammonium Montmorillonite Clays

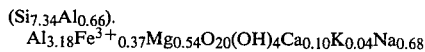

| | | | | Elemental Composition of Quaternary Clay, % | | | | | | i-Propanol |
| | | | X-Ray | Calcd for 99 me Salt per 100 g Clay Reaction | | | Found | | | in Water |
| Seq. No. | Exp. No. E- | Structure of R, n⁻ | Spacing $d^{001}$ °A | C | H | N | C | H | N | Cl | Reaction Medium, % |
|---|---|---|---|---|---|---|---|---|---|---|---|
| 1 | 2708-II | $C_8H_{17}$ | 18.0 | 17.19 | 3.21 | 1.11 | 18.46 | 3.82 | 1.21 | 0.17 | 0 |

TABLE I-continued

Interplanar Spacing and Composition of Quaternary Higher Dialkyl Dimethyl Ammonium Montmorillonite Clays $[R_2N^+(CH_3)_2]_m Clay^{n-} \cdot Cl_k^-$

| Seq. No. | Exp. No. E- | Structure of R, n⁻ | X-Ray Spacing d⁰⁰¹ °A | Calcd for 99 me Salt per 100 g Clay Reaction C | H | N | Found C | H | N | Cl | i-Propanol in Water Reaction Medium, % |
|---|---|---|---|---|---|---|---|---|---|---|---|
| 2 | 2703-II | C₁₀H₂₁ | 21.1–21.5 | 20.11 | 3.69 | 1.07 | 19.38 | 3.84 | 0.79 | 0.12 | 20 |
| 3 | 2723-II | C₁₄H₂₉ | 23.8 | 25.27 | 4.52 | 0.98 | 24.92 | 4.81 | 1.03 | 0.08 | 23 |
| 4 | 2610-II | C₁₆H₃₃ | 25.2 | 27.59 | 4.91 | 0.95 | 28.55 | 5.41 | 0.78 | 0.09 | 30 |
| 5 | 2803-II | C₁₈H₃₇ | 26.8 | 29.67 | 5.24 | 0.91 | 29.32 | 5.41 | 1.06 | 0.03 | 33 |
| 6 | 2639-II | C₂₀₋₂₂H₄₁₋₄₅ | 31.5 | 31.95 | 5.61 | 0.86 | 33.94 | 6.40 | 1.03 | 0.10 | 50 |

EXAMPLE 2

Preparation of Quaternary Ditallow Dimethyl Ammonium Montmorillonite Compositions Having About 0 to 30% Excess of The Ammonium Moiety The refined montmorillonite of Example 1 was also reacted with various quantities of a technical hydrogenated ditallow dimethyl ammonium chloride derived from hydrogenated tallow oil. As such, a quaternary higher dialkyl dimethyl ammonium chloride was used wherein 60% of the alkyl groups had 18 carbon atoms 35% was $C_{16}$ and 5% $C_{14}$. This product was obtained from the Ashland Chemical Company under the trade name Adogen 442-75. This commercial product composition had 75% quaternary salt, 20% isopropanol and 5% water. At room temperature the product is a waxlike solid, but it is easily melted to provide a clear liquid mixture. The quaternary salt is not significantly soluble in cold water but it is readily soluble in aqueous isopropanol. The preparation and analyses of Adogen-442-75 modified montmorillonites are summarized in Table II.

The ditallow dimethyl ammonium montmorillonites of Table II were derived by using various quantities of the quaternary salt reagent per 100 g. dry clay, ranging from amounts corresponding to the ion exchange capacity (90 me) to 35% excess (121 me). Some of the clay modifications were carried out in water, others used a 4 to 1 mixture of water and isopropanol. The large scale reactions were run at ambient temperatures (Seq. Nos. 2-4). The laboratory preparations were carried out at 55°-60° C. in the manner described in the previous example (Seq. Nos. 5-9). The concentration of the clay in the reaction mixture ranged from 2 to 3%. The Adogen 442-75 was added either as such or as a 5-10% solution in a liquid having an identical composition with the clay dispersion medium.

The analysis of a commercial dimethyl ditallow ammonium clay product of the Georgia Kaolin Co., Astratone-40, is shown for comparison under Sequence No. 2 of Table I. Pilot plant preparations were carried out using a sodium montmorillonite slurry (Seq. Nos. 2 and 3) in equivalent and excess amounts. This slurry was prepared from a crude sodium montmorillonite clay mined and dried in Wyoming.

The crude clay (900 lb., i.e. 408 kg.) and Calgon hexametaphosphate dispersant additive (1.5 lb., i.e. 680 g.) were mixed with water (1218 gal., i.e., 4610 liter) for 30 minutes using a Strucher-Wells high speed mixer. The large particle size impurities were then removed from the resulting water gel by passing it through a 100 mesh screen. Thereafter, the finer impurities having a larger than 2 microns size were removed by a DeLaval centrifuge. The resulting stable dispersion had a pH of 8.1.

The refining of the crude clay of 8.85% solids content resulted in a slurry of 3.12% concentration. This slurry was prepared five days in advance. It was then kept in a holding tank at 60° C. since there was no provision for heating the pilot plant reactor vessels.

In both of the pilot plant preparations, 200 gal. of the slurry was used in a polyethylene tank. The Adogen

TABLE II

Elemental Composition of Quaternary Dimethyl Ditallow Ammonium Montmorillonites Prepared Via Ion Exchange Reactions Using Various Quantities of the Quaternary Chloride Reagent

| Seq. No. | Exp. No. of Clay Prep. | Treatment Level me Reactant per 100 g Dry Clay | Designation of Starting Clay | Isopropanol in Water, % (Clay in Mixture, %) | $R_x$ Temp. °C. | Adogen, % (Conc. in Reactant Solution) | Calculated Composition, % 90 me Salt/100 g Clay Conversion C | H | N | Cl | All Salt/100 g Clay Conversion C | H | N | Found Composition % C | H | N | Cl |
|---|---|---|---|---|---|---|---|---|---|---|---|---|---|---|---|---|---|
| 1 | | Nil | MCBP | — | | | | | | | | | | | | | |
| 2 | E-2811-I | 90 | (Astratone 40) | 0 (3) | Ambient | 100 | 26.96 | 4.79 | 0.86 | 0.00 | 26.96 | 4.79 | 0.86 | 28.82 | 5.48 | 1.07 | 0.71 |
| 3 | E-2839-VII | 91 | Suspension | 0 (3) | Ambient | 100 | 27.16 | 5.17 | 0.94 | 0.02 | 27.16 | 4.81 | 0.87 | 27.21 | 4.84 | 0.99 | 0.57 |
| 4 | E-2840-VII | 102 | Suspension | 0 (3) | Ambient | 100 | 29.19 | 5.17 | 0.94 | 0.28 | 29.32 | 5.20 | 0.94 | 29.89 | 5.34 | 0.91 | 0.75 |
| 5 | E-2682-III | 101 | MCBP | 20 (2) | 60 | 10 | 29.01 | 5.09 | 0.93 | 0.26 | 29.13 | 5.16 | 0.93 | 30.11 | 5.75 | 1.03 | 0.09 |
| 6 | E-2686-III | | | 0 (2) | | 100 | | | | | | | | 29.12 | 5.45 | 0.88 | 0.32 |
| 7 | E-2690-III | 111 | MCBP | 20 (3) | 55 | 5 | 30.73 | 5.45 | 0.99 | 0.47 | 30.97 | 5.49 | 0.99 | 32.58 | 6.09 | 1.12 | 0.29 |
| 8 | E-2697-III | 116 | MCBP | 20 (2) | 57 | 10 | 31.56 | 5.60 | 1.01 | 0.57 | 31.85 | 5.64 | 1.02 | 33.28 | 6.22 | 1.09 | 0.39 |
| 9 | E-2698-I | 121 | MCBP | 20 (2) | 57 | 10 | 32.34 | 5.73 | 1.03 | 0.67 | 32.70 | 5.79 | 1.05 | 34.01 | 6.35 | 1.05 | 0.40 |

442-75 was melted at 50° C. The melt was added over a 5 min. period to the slurry which was stirred at 160 rpm at 50° C.

In the case of the 90 milliequivalent treatment, the addition of the quaternary salt (23.28 moles) resulted only in a moderate thickening followed by a rapid viscosity decrease. In contrast, the 99 me. treatment (with 44.1 lbs. Adogen 442 containing 25.6 moles quaternary salt) resulted in substantial but not excessive thickening.

After about 35 minutes stirring both ammonium clay products were filter pressed. In the case of the lower treatment a filter pressure of 30 lbs. was sufficient for getting a sufficiently moisture free cake. The more highly treated product required 60 lbs. for effective filtration. Also, the higher treatment resulted in a foamy, slightly cloudy rather than clear aqueous filtrate.

Both ammonium clays were air dried overnight in an air blown heated oven after filtration. However, by accident the overtreated clay was dried at 70 rather than 60° C. This had no apparent effect. After drying, both products were pulverized.

The analyses of the quaternary ditallow dimethyl ammonium montmorillonites of Table I, in general, show that the organic content of the clay products is increasing with the level of treatment by the quaternary salt. This indicates that the quaternary groups are retained on the clay in quantities in excess of the ion exchange capacity.

The found clay compositions were compared with compositions calculated assuming either the reaction of only equivalent or the reaction of all added quaternary salt. The comparison of the chlorine values showed that, in the case of treatment in isopropanol-water high excess, more than an equivalent but not all the quaternary salt entered the ion exchange (Seq. No. 8 and 9).

In water medium, the reactions were apparently conversions limited as indicated by the relatively high chlorine contents (Seq. Nos. 2–4, 6). In these cases, much of the quaternary reagent remained in the chloride form. The difference caused by the substitution of water by isopropanolic water is particularly shown by the data of the fifth and sixth experiments. The chlorine content of the product was reduced to less than one-third when alcohol was present (Seq. Nos. 5 and 6). At the same time the carbon content increased rather than decreased indicating that the retention of the ammonium groups on the clay was not adversely affected.

To learn about the change of the concentration of metal cations as a function of the treatment level several of the clays of Table I were also analyzed for Na, K and Ca. The values found, were then compared with those for the starting MCBP clay:

| Exp. No. E | Treatment Level me/100 g. | X-Ray Spacing °A | | Elemental Composition, Found, % | | |
|---|---|---|---|---|---|---|
| | | | | Na | K | Ca |
| — | Nil | | | 2.150 | 0.159 | 0.304 |
| 2811-I | 90 | | 26.4 | 0.386 | 0.099 | 0.058 |
| 2682-III | 99 | 12.8 | 26.7 | 0.038 | 0.088 | 0.058 |
| 2690-III | 110 | 12.6 | 31.5 | 0.038 | 0.021 | 0.050 |
| 2698-III | 120 | 12.8 | 21.0 | 35.5 | 0.038 | 0.066 | 0.029 |

The comparison showed that up to the 120 me treatment level, the metal ion concentration was independent from the degree of overtreatment. (The high ion concentrations of the commercial products Astratone 40, were mainly due to incomplete washing). A significant, but minor change in the concentration of K and Ca seemed to occur at the 120 me treatment level.

The X-ray spacing of the clays of various treatment level indicated changes in microstructure. With overtreatment, an increased $d^{001}$ spacing is observed, indicating that the angle of the higher alkyl groups relative to the aluminosilicate layer is increased. Additional peaks are also observed in the spectra. These peaks, the 12.7 A peak probably originating from a $d^{003}$ reflection, indicate new phase formation on overtreatment.

THE METHODS USED TO DETERMINE GELLING ABILITY

All the gel test methods give somewhat different results if organic clays of various particle size are used. Therefore, the dry, ball milled clays were all passed through a 200 mesh screen before testing.

A. The Alkyd Resin Gel Test

Alkyd resins are in general, polyesters derived from fatty acids, polyols such glycerol or glycol, and dicarboxylic acids, usually phthalic anhydride. The resins used in the present tests were long oil alkyd resins, which are most commonly used for general purpose industrial coatings. They were obtained from Reichhold Chemical under the name Beckosol P-296-70 with a computer code number 10-045. The product contains 30% mineral spirits as a solvent. The solid resin (70%) is derived using about 65% soybean oil, 24% phthalic anhydride and 11% glycerol. As such, the product meets federal specification, classification TTR 2660A, Type Class A, vinyl compatible. Its Gardner-Holdt viscosity is Y-$Z_2$. The viscosity of the products supplied was apparently significantly different on the Brookfield scale, when determined using a number three spindle.

For the viscosity determinations, fluid is poured into a pint can where the viscosity readings are taken using a Brookfield viscometer with a number three spindle. The spindle is inserted to the near side of the jar and then moved to the center. Then viscosity readings are taken from low to high stirring rates: at 10 rpm after 40 seconds at this speed, at 20 rpm after 30 seconds, at 50 rpm after 20 seconds and at 100 rpm after 15 seconds. After the viscosity readings, the temperature in the rear side of jar is usually about 30° C. and at the center 35° C.

In the alkyd resin gel tests, three batches of Beckosol P-296-70 were used. Their viscosity characteristics, as determined by the Brookfield viscosimeter, were somewhat different as indicated by the following tabulation:

| Batch Identification of Resin | Brookfield Viscosities, cps, of Long Oil Alkyd Resins After 18-24 hours (at various Stirring Rates, rpm) | | | |
|---|---|---|---|---|
| Beckosol P-296-70 | (10) | (20) | (50) | (100) |
| A | 2800 | 3000 | 3120 | 3200 |
| B | 2000 | 2200 | 2400 | 2400 |
| C | 2400 | 2500 | 2640 | 2620 |

The different batches of the resin showed different responses to the higher dialkyl dimethyl ammonium clay gellants. Therefore, strictly speaking, the data are comparable only when the same batch of resin was used.

The response of these resins to organic clay gellants was determined using available commercial quaternary dimethyl dihydrogenated tallow ammonium clays, as standards, having equivalent amounts of the quaternary group on the clay. The Astratone 40 standard is manufactured by the Georgia Kaolin Co. starting with refined sodium montmorillonite, basically the same clay which was used in our Examples 1 and 2. The Bentone 38 standard is manufactured by N. L. Industries from refined sodium hectorite. The effectiveness of these two ammonium clays in the three batches of alkyd resin was as shown by the following tabulation.

| Dimethyl Ditallow Ammonium Clay | Batch Identification of Resin Beckosol P-296-70 | Brookfield Viscosities of Long Oil Alkyd Resins After 18-24 Hrs. At Various Stirring Rates (rpm) | | | |
|---|---|---|---|---|---|
| | | (10) | (20) | (50) | (100) |
| Astratone-40 | A | 6000 | 5400 | 5120 | 4940 |
| Bentone-38 | A | 6800 | 6200 | 5680 | 5320 |
| Astratone-40 | B | 3200 | 3100 | 3040 | 2960 |
| Bentone-38 | B | 4400 | 4000 | 3760 | 3540 |
| Astratone-40 | C | 3400 | 3400 | 3280 | 3120 |
| Bentone-38 | C | 4400 | 4200 | 3920 | 3740 |

In the test procedure, 1.25 g of ammonium clay is slowly added to 88 g. resin, while stirring it with a high speed, i.e., high shear mixer (with a drill press equipped with a circular Cowle's blade). After mixing for about two to five minutes, a polar solvent mixture consisting of 95% propylene carbonate and 5% water is added in an amount equaling 33% of the clay while stirring to give optimum dispersion and highest viscosity. Thereafter, stirring is continued for an additional five minutes. The resulting gel is then thinned using a solvent, i.e., 10 g odorless mineral spirit, to reduce the viscosity. Viscosity measurements of the resulting mixtures are made in 18 to 24 hours after the air bubbles formed during the stirring rose out of the liquid gels.

B. The Toluene Gel Strength Test

To 294 g. toluene placed into a Waring blender, 6 g. of higher dialkyl dimethyl ammonium clay is added in 45 seconds while it is stirred at a rate of about 10,000 rpm (transformer setting 25). The resulting mixture is then stirred at 15,000 rpm for 90 seconds (transformer setting 100). The stirring rate is then reduced to 13,000 and 2.3 ml polar additive, consisting of 95% commercial (i.e., 99%) methanol and 5% distilled water is added over 30 seconds. The speed is then again increased to 15,000 rpm and the stirring continued for a further 3 minutes.

The gel is then poured into a pint jar which is subsequently rocked and swirled for 30 seconds to remove most of the air bubbles. The jar is then capped tight and put into a 25° C. water bath. After fifteen minutes and 34 hours, viscosity readings are taken in the manner previously described. Between the 10 minutes and 24 hours reading, the jar is capped and set in a 25° C. water bath until the 24 hour reading.

C. The Unsaturated Polyester Test

Unsaturated polyesters are polyesters of a dicarboxylic acid and a diol having a major amount of olefinic unsaturation. Such esters are more extensively defined in U.S. Pat. No. 3,974,125. This patent also describes in detail the styrene pregel method used in the present test. Throughout this work a common unsaturated polyester derived via the esterification of maleic anhydride, phthalic anhydride, propylene glycol mixture was used.

It is commercially produced by the Reichhold Chemical Company and sold e.g. as a 60% polyester, 40% styrene liquid mixture under the number 33-072, 64005.

Styrene pregels were prepared usually at the 6% higher dialkyl dimethyl ammonium clay gellant level by adding the appropriate quaternary clay having less than 200 mesh particle size to polymerization grade styrene stabilized with 50 ppm t-butyl catechol. In a standard test, 3 g. of gellant and 50 g. styrene were placed into a 9.5 cm high, 8.5 cm diameter metal can. The contents were then stirred on a Rockwell Delta 6 Plus 6-15 in. drill press, equipped with a 5 cm wide "Cowles Blade", at 725 rpm to obtain the pregel which was then usually employed for gelling the polyester composition.

An 80% polyester—20% styrene resin was used to make gels containing 40% styrene by adding approximately one part pregel to three parts of the resin.

In a typical procedure 52 g. of the styrene pregel was added to 148 g. of the liquid 80% polyester—20% styrene mixture, using stirring by drill press as described earlier. After 15 minutes stirring, the resulting gels were closed to avoid evaporation, stored at ambient temperatures and/or at 24° C. Viscosity measurements were carried out after 15 minutes and 24 hours using a Brookfield LVT Viscometer with a number 3 spindle at 6 and 60 rpm stirring rate, generally at 24° C.

EXAMPLE 3

Gelling Effectiveness of Various Higher Dialkyl Dimethyl Ammonium Montmorillonite Clays in Alkyd Resins The clay preparations of Example 1, containing 10% excess of the ammonium moiety were tested as gellants in alkyd resins in the manner previously described. The results are shown in Table III.

TABLE III

GEL STRENGTHS IN GENERAL PURPOSE LONG OIL ALKYD RESINS OF QUATERNARY HIGHER DIALKYL DIMETHYL AMMONIUM MONTMORILLONITES

| Seq. No. | Exp. No. E- | Structure of R, n⁻ | Brookfield Viscosities, cps After 18-24 Hrs. (At Various Stirring Rates, rpm) | | | | Alkyd Resin Used[a] |
|---|---|---|---|---|---|---|---|
| | | | (10) | (20) | (50) | (100) | |
| 1 | 2708-IV[b] | $C_8H_{17}$ | 3400 | 3300 | 3280 | 3240 | B |
| 2 | 2703-III[b] | $C_{10}H_{21}$ | 2400 | 2400 | 2600 | 2700 | B |
| 3 | 2609-III | $C_{12}H_{25}$ | 4800 | 4800 | 4960 | 4880 | A |
| 4 | 2723-IV[b] | $C_{14}H_{29}$ | 5000 | 4500 | 4200 | 3960 | C |
| 5 | 2610-III[b] | $C_{16}H_{33}$ | 9400 | 8200 | 7200 | 6480 | A |
| 6 | 2692-III | $C_{18}H_{37}$ | 8000 | 7000 | 5880 | 5560 | A |
| 7 | 2639-III[b] | $C_{20-22}H_{41-45}$ | 5200 | 5300 | 5200 | 5120 | A |

[a]Described under the test methods.
[b]Clay composition described in Table I.

The data of Table III show that all the higher dialkyl dimethyl ammonium clays had a gelling effect on the alkyd resins. The gelling effect of the dioctyl derivative (Seq. No. 1) was particularly surprising since the prior art workers stated that the presence of higher than decyl group was necessary for a gelling effect.

Although all the clays tested were gellants not all of them had a significant thixotropic effect. Only the $C_{14}$ and $C_{18}$ derivatives increased the viscosity of the alkyds significantly more at low than at high stirring rates (Seq. Nos. 4-6). Surprisingly, the hexadecyl derivative seemed to be the most effective thixotropic gelling agent.

EXAMPLE 4

Gelling Effectiveness of Ditallow Dimethyl Ammonium Montmorillonite Clays in an Alkyd Resin and in Toluene as a Function of Their Degree of Overtreatment The gelling effectiveness in an alkyd resin and in toluene of sodium montmorillonite treated with various quantities of Adogen 442-75 was examined by the test methods described earlier. The preparation of the variously overtreated clays was given in Example 2. In the present example, viscosities were determined in a general purpose long oil alkyd resin containing 1.4% of the experimental gellants and in toluene having 2% gellant concentrations.

The test results are given in Table IV. The table also shows the styrene swell, which is determined by slowly adding using a spatula 2 g. of an ammonium clay sample to 100 ml polymerization grade styrene. The styrene was contained in a 100 ml measuring cylinder of about 2.5 cm diameter. On the addition of the clay gelling agents, a spontaneous gelling occurred. The resulting gel volume of the clays was severalfold of the original by the time they fell to the bottom of the cylinder. The volume of the resulting bottom gel "phase" was read after 15 minutes, 2 hours and 24 hours.

The viscosity data of the table show different responses to overtreated clay gellants in alkyd resins and in toluene. In the alkyd resin the moderately overtreated clay showed optimum effectiveness when prepared in aqueous isopropanol (Seq. No. 3). Furthermore, severe overtreatment did not significantly reduce the gel strength in the alkyd (Seq. Nos. 4-6). In contrast, in toluene the moderately overtreated clay was effective only when prepared in water (Seq. No. 2 vs. 3). The more severely overtreated clays had no significant gellant activity in toluene (Seq. Nos. 4-6).

The gel strengths in toluene are somewhat analogous to the styrene swells. In the latter case as well a high degree of overtreatment results in inferior effects. It is felt that the hydrocarbon swelling and gelling activity of completely or overreacted clays is inferior to those only substantially reacted. A similar behavior of ammonium clays towards nitrobenzene was reported by Jordan with a comment of overtreating being deleterious.

EXAMPLE 5

Gelling Effectiveness of Dihydrogenated Ditallow Dimethyl Ammonium Montmorillonite Clays in an Unsaturated Polyester as a Function of Their Degree of Overtreatment The gelling effectiveness of various Astratone 40 type clays in a maleic and phthalic anhydride plus propylene glycol based unsaturated polyester was examined via the styrene pregel method described earlier. This unsaturated polyester is most often used for the preparation of glass reinforced thermoset resins. In the present tests, the final gels contained 40% styrene which serves both as a solvent for the solid polyester and a crosslinking monomer.

The gels resulting from the experiments using variously overtreated gellants were evaluated for their viscosity at 6 and 60 rpm. The viscosity data obtained and the viscosity indices are shown in Table V.

The preparation of the series of increasingly overtreated dihydrogenated ditallow ammonium montmorillonite gellants used was described in Example 2. The nonovertreated Astratone 40 commercial control gellant of 90 me treatment level was also described previously.

TABLE V

VISCOSITY CHARACTERISTICS OF AN UNSATURATED POLYESTER-STYRENE RESIN CONTAINING 1.5% OF VARIOUSLY OVERTREATED DITALLOW DIMETHYL AMMONIUM CLAYS

| | | | Brookfield Viscosities, cps. (At various stirring rates, rpm) | | | | Viscosity Ratios (6 per 60 rpm) | |
|---|---|---|---|---|---|---|---|---|
| | | | After 15 Min. | | After 18-24 Hr. | | After 15 Min. | After 18-24 Hr. |
| Seq. No. | Exp. No. E- | Treatment me | (6) | (60) | (6) | (60) | | |
| 1 | 2811-I | 90$^{(a)}$ | 1400 | 680 | 1420 | 702 | 2.05 | 2.02 |
| 2 | 2682-III | 99 | 1800 | 766 | 1860 | 770 | 2.35 | 2.42 |
| 3 | 2690-III | 110 | 2200 | 858 | 2220 | 862 | 2.59 | 2.58 |
| 4 | 2697-III | 115 | 2100 | 822 | 2140 | 830 | 2.55 | 2.58 |
| 5 | 2698-III | 120 | 1720 | 694 | 1840 | 740 | 2.48 | 2.49 |

$^{(a)}$Astratone 40, commercial clay.

TABLE IV

GELLING EFFECTIVENESS OF DITALLOW DIMETHYL AMMONIUM MONTMORILLONITE CLAYS AS A FUNCTION OF THEIR DEGREE OF OVERTREATMENT

| | | | | Brookfield Viscosities, cps. | | | | Brookfield Viscosities, cps (At Various Stirring Rates, rpm) | | | | | | | | Styrene Swell Ml | |
|---|---|---|---|---|---|---|---|---|---|---|---|---|---|---|---|---|---|
| | | | 20% i-Propanol in Water Medium | In Long Oil Alkyd Resin After 18-24 Hours (At various Stirring Rates, rpm) | | | | In Toluene | | | | | | | | | |
| | | | | | | | | After 15 Minutes | | | | After 24 Hours | | | | | |
| Seq. No. | [(Tallow)$_2$N$^+$(CH$_3$)$_2$]Cl$^-$ me/100 g Dry Clay | (Exp. No. E-) | | (10) | (20) | (50) | (100) | (10) | (20) | (50) | (100) | (10) | (20) | (50) | (100) | 2 Hr. | 24 Hr. |
| 1 | 90 | (2811-I) | No | 5200 | 5200 | 4960 | 4880 | 320 | 132 | 62 | 41 | 304 | 160 | 83 | 46 | | |
| 2 | 101 | (2686-III) | No | 6400 | 5800 | 5280 | 4900 | 554 | 226 | 94 | 59 | 408 | 198 | 87 | 54 | 30 | 31 |
| 3 | 101 | (2682-III) | Yes | 8000 | 7000 | 5880 | 5280 | 136 | 60 | 26 | 25 | 96 | 60 | 24 | 20 | 30 | 30 |
| 4 | 111 | (2690-III) | Yes | 6800 | 6000 | 5360 | 5600 | 64 | 36 | 21 | 19 | 64 | 40 | 21 | 21 | 24 | 25 |
| 5 | 116 | (2697-III) | Yes | 6400 | 6000 | 5280 | 5080 | 64 | 40 | 21 | 18 | 72 | 40 | 24 | 21 | 26 | 25 |
| 6 | 121 | (2698-III) | Yes | 6200 | 5700 | 5280 | 4880 | 64 | 40 | 22 | 20 | 72 | 40 | 22 | 20 | 23 | 22 |

The data of table IV show that the clay commercial gellant (Sequence No. 1) was generally less effective both in terms of absolute viscosities and viscosity indices than the overtreated clays (Sequence Nos. 2-6). The thixotropic effectiveness of the experimental clays was clearly dependent on their treatment level. The relatively poor performance of the commercial clay was obviously a consequence of its low treatment level.

The optimum treatment level was in the range of 110-115 milliequivalent dimethyl ditallow ammonium chloride per 100 g dry clay (Sequence Nos. 3,4). A comparison of the viscosity values of the commercial clay with the optimally treated clay shows rounded 60 rpm viscosities of about 1500 versus 2000 and viscosity indices of 2.0 versus 2.6. The better performance of the optimally overtreated clay seems particularly important in terms of the thixotropic index, which is the most important parameter in reinforced plastics applications.

The value of overtreatment in terms of the ammonium clay gellant needed to achieve certain thixotropic properties can be estimated from the response of the unsaturated polyester resin to different concentrations of the normal Astratone 40 gellant (E-2811-1). This concentration response is shown by the following tabulation.

| Concentration of Astratone 40 Gellant % | Brookfield Viscosities, cps (At various Stirring Rates, rpm) | | | | Viscosity Ratios (6 per 60 rpm) | |
|---|---|---|---|---|---|---|
| | After 15 Min. | | After 18-24 Hrs. | | After 15 Min. | After 18-24 Hr. |
| | (6) | (60) | (6) | (60) | | |
| 0 | 280 | 232 | 280 | 232 | 1.21 | 1.21 |
| 1.0 | 620 | 396 | 690 | 432 | 1.57 | 1.57 |
| 1.5 | 1400 | 680 | 1420 | 702 | 2.05 | 2.02 |
| 2.0 | 2000 | 820 | 2460 | 1132 | 2.43 | 2.17 |

A comparison of the data shows that in terms of viscosities at 6 rpm increasing the Astratone 40 concentration from 1.5% to 2%, i.e. by 33%, achieves the performance of the overtreated clay at 1.5%. However, increasing the Astratone 40 concentration to 2% does not result in the same high viscosity index which was obtained by 1.5% of the overtreated clay.

As evidenced from these examples, the overtreated clays of the present invention are capable of providing improved thixotropic compositions when they are admixed with major quantities of an oxygenated organic compound. The amount of the overtreated clay when used as a gellant in these systems will be in an amount sufficient to attain the desired thixotropic characteristics for the particular composition being prepared.

In many instances, the amount of the overtreated clay of the present invention will be in the range from about 0.2 to 10% by weight of the entire composition, preferably the overtreated clay will be present in an amount ranging from about 0.5 to about 3 weight percent. The balance of the composition will be comprised of the oxygenated organic compound, preferably an oxygenated organic resin and more preferably an alkyd type polyester or an unsaturated polyester. In the latter case the composition will typically contain a solvent for the oxygenated organic resin in an amount to sufficiently disperse or dissolve the resin.

While the invention has been described in connection with specific embodiments thereof, it will be understood that it is capable of further modification, and this application is intended to cover any variations, uses, or adaptations of the invention and including such departures from the present disclosure as come within known or customary practice in the art to which the invention pertains and as may be applied to the essential features hereinbefore set forth, and as fall within the scope of the invention.

What is claimed is:

1. A process for preparing a quaternary higher dialkyl dimethyl ammonium clay composition of layer and chain type structure comprising reacting in a reaction media comprising a water miscible polar organic solvent and water having dispersed therein mineral clays of layer and chain type structure with a quaternary higher dialkyl dimethyl ammonium salt dissolved in said reaction media, wherein the concentration of ammonium ions of said ammonium salt ranges from about 12 to 25% above the ion exchange capacity of the clay as expressed in milliequivalents per 100 g. dry clay and as determined by the amount of ammonium acetate which reacts with the clay when an excess of ammonium acetate is used as a reactant.

2. The process of claim 1 wherein the concentration of the ammonium ions ranges from about 15 to about 20% above the ion exchange capacity of the clay.

3. The process of claim 1 wherein the said higher dialkyl substituent of the quaternary higher dialkyl dimethyl ammonium salt is $C_8$ to $C_{35}$ alkyl.

4. The process of claim 1 wherein the said higher dialkyl substituent of the quaternary higher dialkyl substituent of the quaternary higher dialkyl dimethyl ammonium salt is $C_{16}$ to $C_{18}$ alkyl.

5. The process of claim 1 wherein the polar organic solvent is a member selected from the group consisting of $C_1$ to $C_{12}$ alcohols, ketones, ethers, nitriles, sulfones, carboxylic acids, carboxylic esters and amides.

6. The process of claim 1 wherein the polar organic solvent is isopropanol.

7. The process of claim 1 wherein the solvent to water ratio ranges from about 1:20 to about 2:1.

8. A process for preparing a quaternary higher dialkyl dimethyl ammonium clay composition of layer and chain type structure comprising reacting in a reaction media comprising isopropanol and water having dispersed therein a Wyomining montmorillonite clay with a dihydrogenated ditallow dimethyl ammonium chloride dissolved in said reaction media, wherein the concentration of ammonium ions of said ammonium salt ranges from about 15 to 20% above the ion exchange capacity of the clay as expressed in milliequivalents per 100 g. dry clay and as determined by the amount of ammonium acetate which reacts with the clay when an excess of ammonium acetate is used as a reactant.

9. A thixotropic composition comprising a major amount of an oxygenated organic compound and a quaternary $C_{14}$ to $C_{22}$ dialkyl dimethyl ammonium clay gellant of layer and chain type structure containing ammonium ions in a concentration ranging from about 12 to about 25% above the ion exchange capacity of the clay as expressed in milliequivalents per 100 g. dry clay and as determined by the amount of ammonium acetate which reacts with the clay when an excess of ammonium acetate is used as a reactant, said clay gellant being present in amounts sufficient to attain the desired thixotropic characteristics.

10. The thixotropic composition of claim 9 wherein the oxygenated compound is an alkyd polyester.

11. A thixotropic composition comprising a major amount of an oxygenated organic compound and a quaternary dihydrogenated ditallow dimethyl ammonium montmorillonite clay gellant containing ammonium ions in a concentration ranging from about 15 to 20% above the ion exchange capacity of the clay as expressed in milliequivalents per 100 g. dry clay and as determined by the amount of ammonium acetate which reacts with the clay when an excess of ammonium acetate is used as a reactant, said clay gellant being present in amounts sufficient to attain the desired thixotropic characteristics.

12. The thixotropic composition of claim 11 wherein the oxygenated compound is an alkyd polyester.

13. A thixotropic composition comprising a major amount of an alkyd polyester and a quaternary higher dialkyl dimethyl ammonium clay gellant of layer and chain type structure containing ammonium ions in a concentration ranging from about 12 to about 25% above the ion exchange capacity of the clay as expressed in milliequivalents per 100 g. dry clay and as determined by the amount of ammonium acetate which reacts with the clay when an excess of ammonium acetate is used as a reactant, said clay gellant being present in amounts sufficient to attain the desired thixotropic characteristics.

14. The thixotropic composition of claim 13 wherein the clay is three layered.

15. The thixotropic composition of claim 14 wherein the clay is montmorillonite.

16. A thixotropic composition comprising major amounts of an unsaturated polyester and styrene monomer solvent and a quaternary higher dialkyl dimethyl ammonium clay gellant of layer and chain type structure containing ammonium ions in a concentration ranging from about 12 to about 25% above the ion exchange capacity of the clay as expressed in milliequivalents per 100 g. dry clay and as determined by the amount of ammonium acetate which reacts with the clay with an excess of ammonium acetate is used as a reactant, said clay gellant being present in amounts sufficient to attain the desired thixotropic characteristics.

17. The thixotropic composition of claim 16 wherein the clay is three layered.

18. The thixotropic composition of claim 16 wherein the clay is montmorillonite.

19. A thixotropic composition comprising a major amount of an unsaturated polyester and styrene monomer solvent and a quaternary dihydrogenated ditallow dimethyl ammonium montmorillonite clay gellant containing ammonium ions in a concentration ranging from about 15 to 20% above the ion exchange capacity of the clay as expressed in milliequivalents per 100 g. dry clay and as determined by the amount of ammonium acetate which reacts with the clay with an excess of ammonium acetate is used as a reactant, said clay gellant being present in amounts sufficient to attain the desired thixotropic characteristics.

* * * * *